March 26, 1968 R. FERWERDA 3,374,901
LIVE BOOM SUPPORTING LIVE BOOM OR HOIST TRACK
Filed April 18, 1966 5 Sheets-Sheet 1
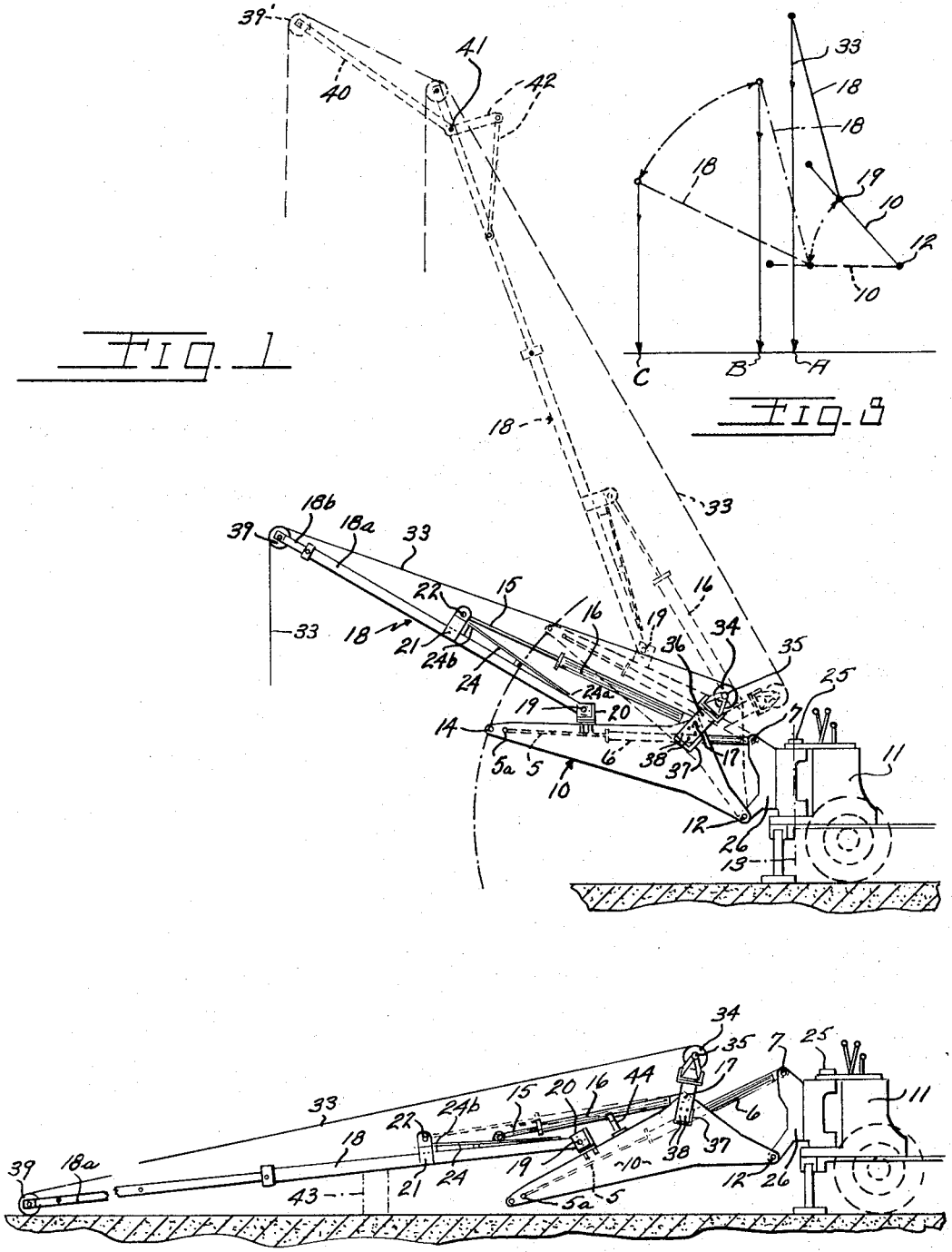
INVENTOR
RAY FERWERDA
BY
Baldwin, Doran & Egan
ATTORNEYS

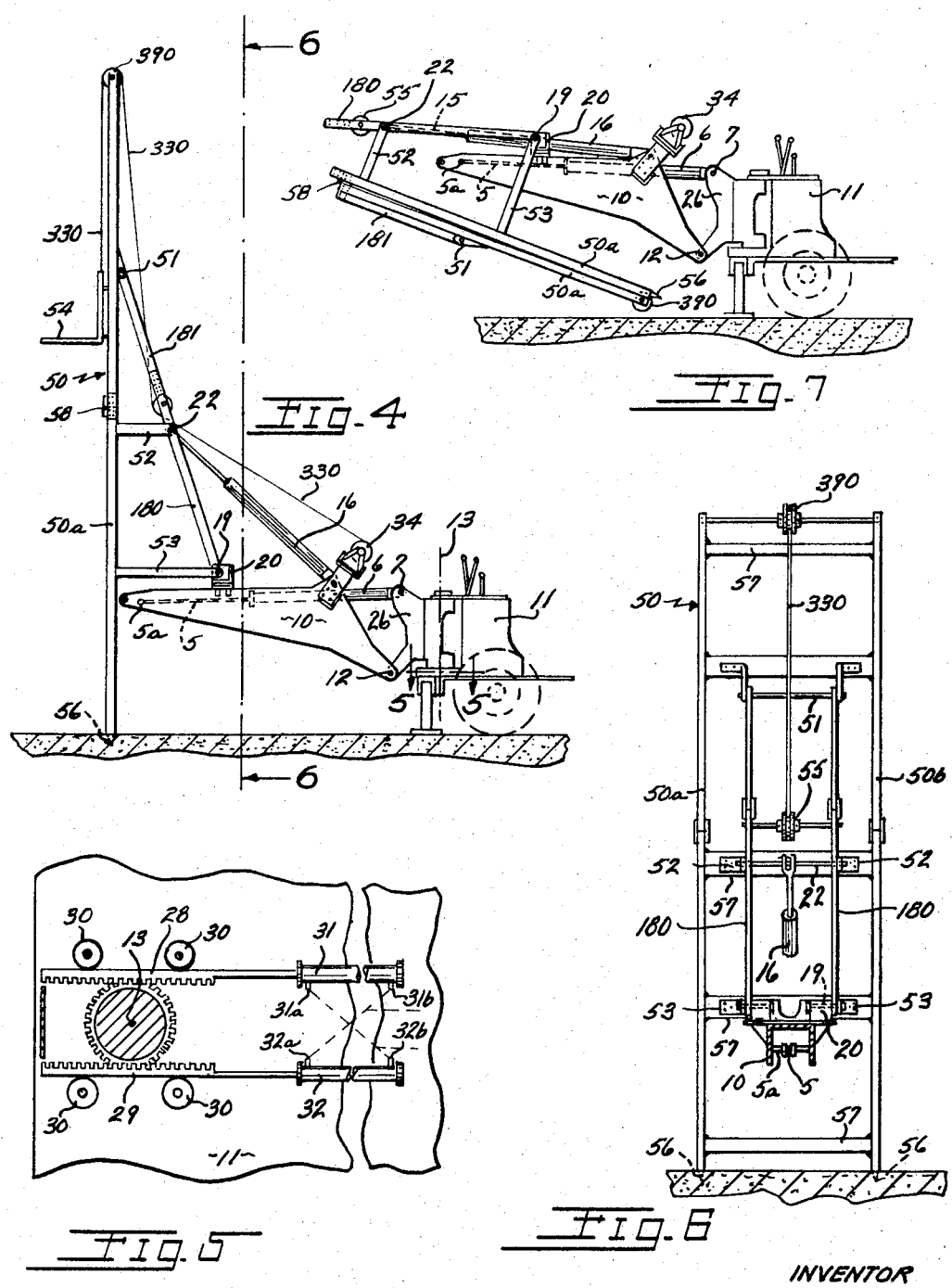

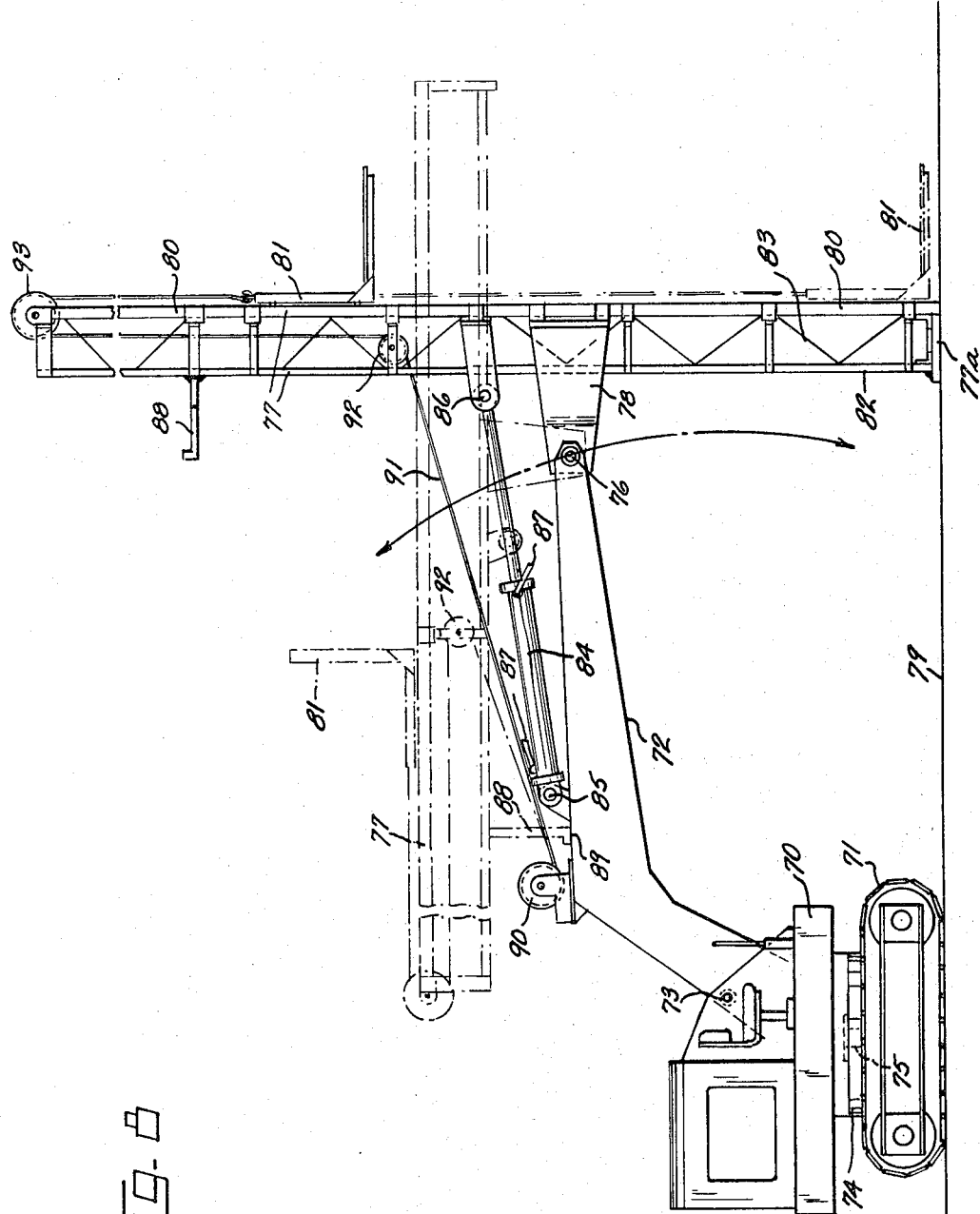

INVENTOR
RAY FERWERDA
BY
Baldwin, Doran & Egan
ATTORNEYS

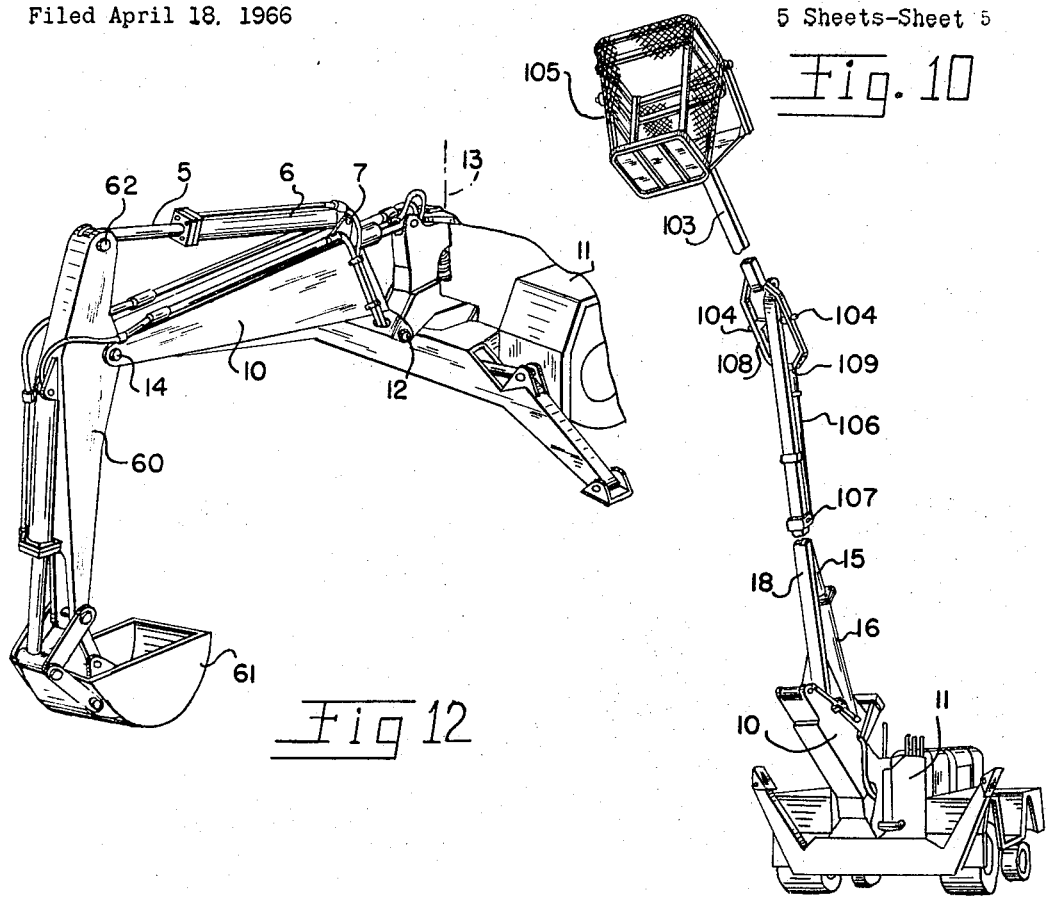

//  # United States Patent Office 3,374,901
Patented Mar. 26, 1968

3,374,901
LIVE BOOM SUPPORTING LIVE BOOM
OR HOIST TRACK
Ray Ferwerda, 1050 NW. 163rd Drive,
North Miami, Fla. 33169
Continuation-in-part of applications Ser. No. 362,331,
Apr. 24, 1964, and Ser. No. 453,651, May 6, 1965.
This application Apr. 18, 1966, Ser. No. 543,277
9 Claims. (Cl. 212—55)

ABSTRACT OF THE DISCLOSURE

In a backhoe having a main boom with power means for slewing it about a vertical pivot mounting on a carrying vehicle, and having a first hydraulic jack mounted between said vertical pivot mounting and the end of the main boom for oscillating the latter about a first horizontal pivot on said vertical pivot mounting, and having a second hydraulic jack pivotally mounted near the vehicle end of the main boom and adapted to have its outer end pivotally connected to a dipper stick of a backhoe bucket; means is provided, after the dipper stick is disassembled, to mount the lower end of an auxiliary boom on a second horizontal pivot intermediate the ends of the main boom, and for then pivotally connecting the outer end of the second jack to a point on the auxiliary boom spaced from said second horizontal pivot. The parts are so arranged that one operator may so convert the backhoe for use of the lifting boom. In one modification the lifting boom may support a rigid vertical hoist assembly which may be folded compactly for vehicle travel.

---

This application is a continuation-in-part of my copending application Ser. No. 453,651, filed May 6, 1965, and now abandoned, for Live Boom Mounted On Live Boom, and also a continuation-in-part of my copending application Ser. No. 362,331, filed Apr. 24, 1964 for Co-acting Boom Structure.

This invention relates to improvements in a lifting structure including a live boom mounted upon another live boom, and particularly to a quick and easy means for converting primarily a digging apparatus into primarily a lifting apparatus.

In digging apparatus known as a backhoe, a live boom is mounted upon a vehicle for pivoting movement about both a horizontal axis and a vertical axis and a dipper stick is pivotally mounted on the end of that live boom extending above the boom for attachment to a manipulating hydraulic jack to swing it about its pivot. The dipper stick also extends below the boom and a digging bucket is usually mounted on the lower end of the dipper stick. A contractor using such a device for digging on a job quite often has the necessity of lifting and manipulating various objects and it is an object of the present invention to provide means for quickly and efficiently converting the primarily digging apparatus of the backhoe to the primarily lifting apparatus of the present invention which may be done very quickly and by one man.

Another object of the present invention is to provide various pieces of apparatus rendering such transformation of digging apparatus to lifting apparatus simple and efficient.

Another object of the present invention is the provision for placing and supporting a vertical hoist assembly for use in connection with the lifting apparatus.

Other objects and advantages of the present invention will be apparent from the accompanying drawings and description and the essential features thereof will be set forth in the appended claims.

In the drawings:

FIG. 1 is a side elevational view of the lifting apparatus of the present invention as converted from a digging apparatus with two different positions of the parts indicated by different type of line;

FIG. 2 is a side elevation of the apparatus in FIG. 1 showing the parts in position for assembling the lifting apparatus upon a portion of the digging apparatus;

FIG. 3 is a diagrammatic view illustrating one use of this invention of a live boom on a live boom for manipulating a load;

FIG. 4 is a view of one modification wherein a vertical hoist assembly is supported by an apparatus similar to that shown in FIG. 1;

FIG. 5 is a transverse fragmental section view, enlarged, taken along the line 5—5 of FIG. 4;

FIG. 6 is a section taken along the line 6—6 of FIG. 4;

FIG. 7 shows the structure of FIG. 4 moved to a carrying position for travel along a road or the like;

FIG. 8 shows another embodiment wherein a vertical boom in the form of a hoisting track is mounted on a backhoe boom;

FIG. 10 shows another modification wherein a live boom is mounted on a backhoe boom and a lever is pivotally mounted on the live boom for supporting a basket adapted to carry a man, together with means for manipulating the lever which in turn is mounted on the live boom;

FIG. 11 is a view of the device of FIG. 10 in folded position of the lever for transportation purposes; while FIG. 12 is a view of the type of backhoe which this invention is intended to modify.

Figure 9:
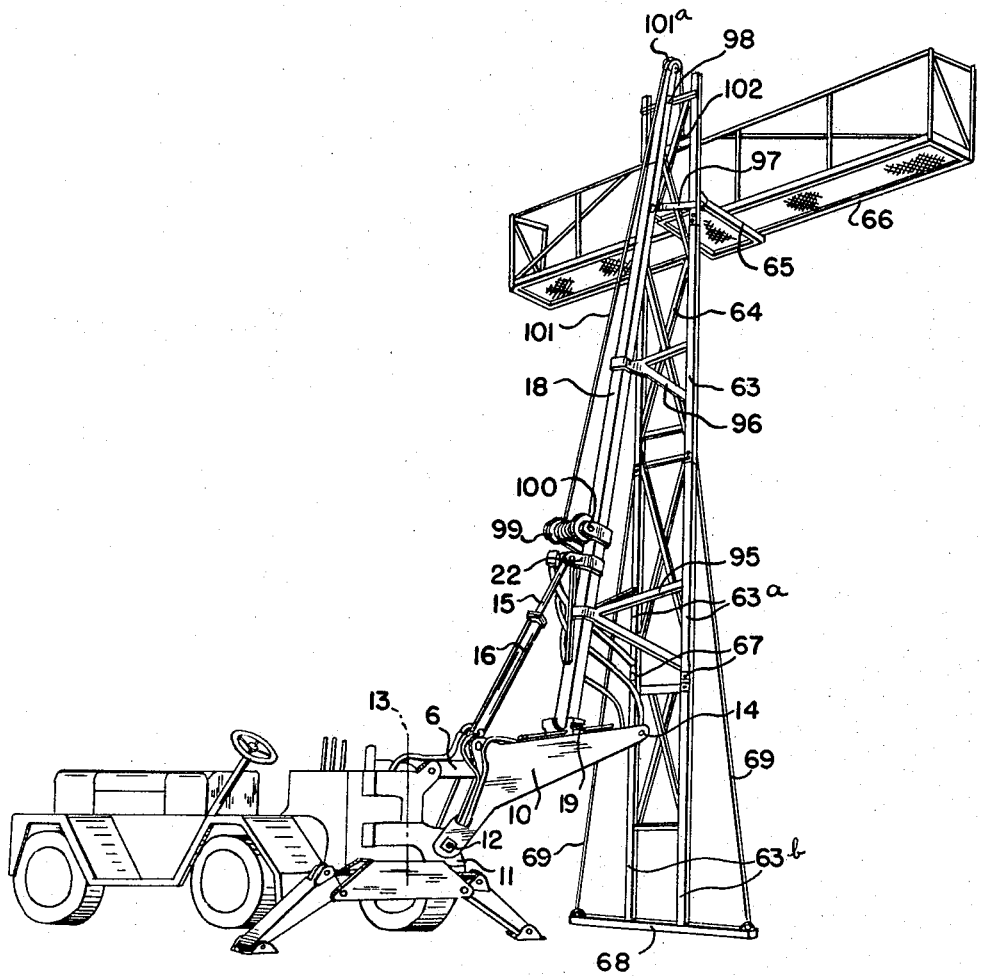
FIG. 9 shows another embodiment where a lifting track is mounted on a live boom which in turn is mounted on the backhoe boom.

A common type of backhoe illustrated in FIG. 12 provides a digging boom 10 mounted on a suitable vehicle 11 for pivotal movement about a horizontal axis 12 or about a vertical axis 13. Such a boom is provided with a pivot at its outer end at 14 to which digging apparatus may be mounted as for instance a dipper stick 60, pivotally mounted at 14, carrying a digging bucket 61 at its lower end, and extending above the pivot 14 to be connected at 62 to the piston rod 5 of a hydraulic jack 6 pivotally mounted to the boom 10 on a horizontal pivot 7.

For converting the above digging apparatus to a lifting apparatus, I provide a lifting boom 18 which may be a single member, but which in the present instance is shown as a telescoping boom having a portion of larger cross section 18a into which an extensible portion 18b may telescope, the portion 18a being hollow for this purpose. A pin 18c holds the telescoped parts in the desired extended position. This boom is mounted by means of a horizontal pivot pin 19 to a bracket means 20 which is either welded or bolted to the boom 10 at a proper location as will presently be described. Means is provided on the boom 18 for attachment of the hydraulic jack piston rod 15 of the jack 16 when the apparatus is converted to lifting purposes. This means comprises a bracket 21 welded or bolted to the boom section 18a and provided with a horizontal pivot pin 22 for securing the piston rod 15 to the bracket 21.

Slide means is preferably provided to aid the operator in connecting the piston rod 15 at the point 22 when assembling the lifting apparatus upon conversion from the digging apparatus. This slide is indicated at 24 and begins at the level of the upper face of the boom portion 18a near the pivot 19 and is inclined upwardly and outwardly to end 24b which is adjacent the pivot pin 22 sufficiently to allow the piston rod 15 to slide along the slide means 24 into proper position for inserting the pivot pin 22.

This means for slewing the boom 10 about the vertical pivot axis 13 is best seen in FIG. 5. The vertical pivot means is indicated at 25 which may be a single shaft extending the full vertical height of the mounting bracket 26, but preferably is a divided shaft having upper and lower portions suitably journaled in the bracket 26 or in the adjoining portions of the vehicle 11. To the bottom end of the shaft means is rigidly secured a gear 27 which meshes on opposite sides with a pair of racks 28 and 29 which are held in mesh with the teeth of the gear 77 by means of idler rollers 30. Suitable hydraulic jacks 31 and 32 have their piston rods secured to the racks 28 and 29 respectively and hydraulic means, not shown, is provided for simultaneously introducing pressure fluid at 31a in jack 31 or at 32b in jack 32 so as to cause the gear 27 to rotate in a clockwise manner; or, for movement in the opposite direction, hydraulic fluid is simultaneously introduced at 31b and 32a of the jacks 31 and 32 respectively. It is believed no further showing of this mechanism is necessary since the same is old and well known.

Means is provided for manipulation of a load relative to the boom 18 by means of a cable 33 or the like. This comprises a winch 34 which includes a motor driving a drum, rotatable about a horizontal axis 35 in a bracket 36 which is secured in L-shape seat means 37 provided on opposite sides of the boom 10. The bracket 36 is secured to the boom 10 by means of bolts 38 so that the same is readily attached or removed. A suitable sheave 39 is pivotally mounted at the outer end of the boom portion 18b so that the cable 33 may pass thereover and manipulate a load below the outer end of the boom.

It will be understood that a jib boom 40 may be mounted on the outer end of the boom portion 18b as shown in FIG. 1 by means of a pivot pin 41 and a holding bracket 42 in which case the pulley 39 is mounted at the outer end of the jib as shown at 39'. However, the use of this boom 40 forms no part of this invention.

With the device in use as a backhoe, the boom 10 has a dipper stick and bucket secured to its outer end as above described and the hydraulic jack 16 has its piston rod connected at 15a to a suitable pivot in the boom 10. Suitable controls are provided for supplying pressure fluid to the jacks 31 and 32 to provide the slewing action around the vertical axis 13, and suitable hydraulic apparatus for manipulating the jack 6 to provide pivoting action of boom 10 around the horizontal pivot 12. Such controls are well known and are not necessary to be shown here.

To convert the backhoe digging apparatus to the lifting apparatus of the present invention, the piston rod 15 of hydraulic jack 16 is disconnected from the upper end of the dipper stick, and then the dipper stick is disconnected from its pivot 14 and the dipper stick and bucket are removed. The boom 18 is then placed on one or two supports 43 which may be steel drums or the like, or whatever is available. The jack 16 is then temporarily supported on a Y-shape member 44 secured to the top of the boom 10. The position of the parts is as shown in FIG. 2. The vehicle 11 is then moved toward the boom 18 to cause the boom 10 to pass under the right-hand end of the boom 18 and place the seat member 37 in position to receive the right-hand end of the boom 18, after which the pivot pin 19 may be inserted. The hydraulic jack 16 is then operated to move the piston rod 15 outwardly from the full line position of FIG. 2 to the dotted line position, the slide means 24 causing the end of piston rod 15 to move slowly upwardly until it is in position to insert the pivot pin 22 in the bracket. Seat 20 is preferably so fixed on the boom 10 that the piston rod 15 is fully extended when the pivot pin 22 is inserted. The winch 34 is then lifted in position in the seat means 37, and the bolts 38 secured. This may be done in a one man operation by attaching a jib boom to the end of boom 10 enabling the operator to pick up the winch 34 from the ground and swing it back over the boom 10 and lower it into position on the seat means 37. The cable 33 is then run out from the winch over the pulley 39 and the lifting device is ready to operate.

As mentioned before, suitable controls are provided for moving the boom 10 about its horizontal pivot 12 or its vertical pivot axis 13; and other suitable controls are provided for manipulating the hydraulic jack 16 so as to manipulate the boom 18 about its pivot axis 19. The use of these two manipulatable booms 10 and 18 either separately or collectively gives a very flexible action to the lifting apparatus. Note that the connection of jack 16 to the main boom at 17 gives a shorter moment arm there relative to pivot 12 than the moment arm about the same pivot 12 where jack 6 is connected to the main boom at 5a. This means that if auxiliary boom 18 is supporting a load when main boom 10 is moved about pivot 12, the power available at pivots 17 and 19 is greater than that applied at pivot 5a.

Referring to FIG. 3, boom 10 is shown in full lines in raised position relative to its axis 12 and the boom 18 is shown in raised position about its axis 19 to hold a load on cable 33 at position A. In this position of the parts, the operator has assured himself that the column strength of boom 18 is sufficient to hold the load in the position of the parts. The operator may now move the load to position B, if that is necessary, by lowering boom 10 to the dotted line position and by raising boom 18 at the same time to the dot-dash line position thus maintaining the same vertical angle of the boom 18. On the other hand, if the boom 18 is in no way overloaded, it may be lowered to the dash line position indicated in FIG. 3 which will move the load to position C, thus providing great flexibility to the lifting apparatus of this invention. As viewed in FIG. 1, it will be seen that the hydraulic jack 15, 16 is substantially coplanar with the hydraulic jack 5, 6, and that these two hydraulic jacks are staggered so that they partially overlap in vertical projection. This makes possible a wide oscillation of each boom about its associated horizontal pivotal connection, at 12 with respect to the main boom, and at 19 with respect to the auxiliary boom.

In the modification shown in FIGS. 4, 6 and 7, parts like those previously described and performing the same functions are given the same reference characters. Here the boom 180 is pivotally connected at 19 to the seat means 20 mounted on the boom 10. The piston rod 15 of the hydraulic jack 16 is pivotally connected at 22 to the boom 180. A boom in the form of a vertical hoist assembly 50 is pivotally connected at 51 to the outer end of boom 180 and is connected by rigid struts 52 and 53 to the boom 180 as, for instance, at the pivot points 22 and 19, respectively, although this structure may be greatly modified, it only being necessary to make the hoist assembly 50 such that it is manipulatable by raising and lowering the boom 180. The hoist assembly provides two parallel tracks as shown at 50a and 50b in FIG. 6. The parts 50a, 50b, 52, 53, and the bifurcated boom 180 are arranged to straddle the boom 10 as clearly seen in FIG. 6. A hoist platform 54 is provided with means for traveling vertically along the hoist assembly 50 where the parts 50a and 50b are made into guide tracks. The platform 54 may be used to carry a man or a wheelbarrow or any other load vertically along the vertical hoist assembly. This is manipulated by means of a cable 330 passing over the pulley 390 at the top of the vertical mast assembly. If necessary or desirable, an extra sheave 55 is provided to control cable 330.

Preferably, but not necessarily, the members 50a and 50b are provided at their lower ends with spikes 56 to anchor the same in the ground. Suitable cross struts 57 may be rigidly connected between the parts 50a and 50b to strengthen the structure as shown in FIG. 6.

Means is preferably provided for folding the upper portion of the vertical hoist assembly and boom 180 to a position generally parallel to the lower portion thereof when the same is to be carried by the vehicle 11 along a road or the like. To this end, the boom 180 is made in two portions held together by bolted plates 181 which may be detached when folding the vertical hoist assembly. Likewise, the members 50a and 50b are connected by a hinge 58 so that the parts may be folded as shown in FIG. 7 with the upper and lower parts of 50a and 50b lying parallel to each other respectively and with the sheave 390 alongside the pins 56. The jack 16 holds the parts in this position relative to the boom 10 when the vehicle 11 is traveling.

Jacks 16 may be extended from the position of FIG. 4 to lean the upper end of the vertical hoist assembly over the roof of a building to deposit materials.

A further embodiment of this invention is shown in FIG. 8. Here a vehicle 70 mounted on a crawler track 71, or otherwise on wheels as desired, carries a boom 72 pivotally mounted on the vehicle at 73 for oscillation about the pivot by power means not shown. Preferably also the bed of the vehicle is rotatably mounted on the crawler track 71 by a turntable 74 rotatable about a vertical axis 75 by power means not shown. In this manner the boom 72 may be manipulated to any desirable point. Pivotally mounted on the outer end of the boom 72 on a horizontal pivot 76 is a rigid boom in the form of a track frame 77 similar to that shown in FIG. 4 but with differences which will be pointed out. Rigid with the track frame are a pair of parallel brackets 78 for attaching the rigid track frame to the boom 72 for oscillating motion about the pivot. The arrangement of the brackets 78 and the length of the rigid track frame as seen in vertical position in FIG. 8 is such that in the vertical portion shown the bottom of the frame at 77a rests on the surface 79 which is substantially coplanar with that upon which the vehicle 70 travels.

The portion of the rigid track frame 77 seen toward the right in FIG. 8 comprises two rigid tracks 80 parallel to each other and generally of U-form and adapted to support a carriage 81 for travel along the frame by two parallel vertical side members provided with means well known for holding the carriage to the track for rolling movement therealong. The track frame 77 is useful in the vertical position of FIG. 8 only if it is strong enough as a beam or column to support loads. To this end, a truss structure is indicated wherein parallel trusses are provided associated with each of the tracks 80 wherein the track 80 is one chord of the truss, the other chord is indicated at 82 and bracing at 83.

Power means is provided for moving the rigid track frame 77 between the substantially vertical and substantially horizontal positions. In FIG. 8, this comprises a hydraulic jack 84 pivotally mounted at 85 on the boom 72 and having a piston rod pivotally connected at 86 with a point on the track frame spaced from the pivot 76 so that operation of the hydraulic jack 84 by pressure fluid in the lines 87 is adapted to move the rigid track frame from the full line substantially vertical position of FIG. 8 to the dot-dash substantially horizontal position. A stop member 88 on the rigid track frame engages against the boom 72 at 89 to prevent damage to parts of the hydraulic jack and the boom 72 when the rigid frame is moved to the horizontal position.

Means is provided for moving the carriage 81 up and down on the rigid track frame. In FIG. 8 this comprises a power driven hydraulic winch 90 mounted on the rear end of the boom 72 and connected with carriage 81 by a cable 91 passing over sheaves 92 and 93 carried by the rigid track frame.

In one use of the boom 72 a dipper stick for a shovel is pivotally mounted at 76 and manipulated by the hydraulic jack 84. By my invention such a vehicle is quickly transformed by disconnecting the dipper stick and attaching the rigid frame 77.

In the modification of FIG. 9, the fundamental parts of the backhoe are like those shown in FIGS. 1 and 2 and they have been given similar reference characters. The live boom 18 is pivotally mounted on the backhoe boom 10 at the horizontal pivot point 19. Removably secured to the boom 18 (and not otherwise attached to the boom 10) is the vertical hoisting track 63 which comprises a pair of parallel tracks rigidly connected with cross bracing 64. Each of the tracks 63 is a U-shape opening toward the front, or away from the viewer in FIG. 9, to receive suitable parts on the carriage 65 as previously described adapted to hold the carriage in the track and to roll up and down therein. A platform 66 to support a worker may be attached to the carriage 65 as shown, if desired. Each of the upper parallel track portions 63a is connected by a hinge 67 to corresponding lower track portions 63b. A rigid foot piece 68 connects the lower ends of the portion 63b. Flexible cables 69 are connected between the outer ends of the foot piece 68 and held tightly by means not shown on mid-points of the upper track portion 63a. This strengthens the vertical hoist track structure.

The means rigidly connecting the upper track portions 63a with the boom 18 are here shown as four brackets 95, 96, 97 and 98 which are rigidly attached to the track portion 63a and bolted or otherwise temporarily secured rigidly to the boom 18.

Means is provided for raising and lowering the carriage 65 on the vertical track 63 and this comprises a winch 99 connected to boom 18 by a removable bracket 100. A cable 101 extends from the winch over a pulley 101a at the top of the boom 18 and is then extended downwardly and connected to a portion of the carriage 65 at 102.

Here again, the backhoe normally equipped with a dipper stick pivotally connected to the boom 10 at 14 and actuated by the jack 15, 16 and previously described, is quickly converted to a use principally as a lifting mechanism. The dipper stick is disconnected from boom 10 and the piston rod 15 is disconnected from the dipper stick. Boom 18 is then connected to the boom 10 by the pin 19 and the piston rod 15 is connected at 22 to the bracket 21 which is bolted to the boom 18. The brackets 95, 96, 97 and 98 are then connected to boom 18 and the hydraulic winch is rigged up as described. If it is desired to transport this equipment from one place to another without disconnecting all parts, the vertical track member 63 is folded about the hinges 67 so that the lower portions 63b of the track fold beneath the boom 10 into a carrying position. The flexible member 69 permits such folding.

In the embodiment of FIGS. 10 and 11, the basic backhoe boom 10 mounted on vehicle 11 as previously described is provided with the hydraulic jack 15, 16 as previously described for tilting the boom 18 about its pivotal mounting 19 which in turn is carried by the backhoe boom 10. Near the upper end of the boom 18 a lever arm 103 is pivotally mounted on the boom 18 at a pivotal axis 104. To the outer or free end of the arm 103 there is attached a basket 105 or the like adapted to carry a man doing maintenance work on outdoor lighting, or tree trimming, or some such occupation. The other end of the arm 103 is operatively connected with an hydraulic jack 106 which in turn is pivotally carried on a bracket 107 removably mounted on the boom 18. In this case, a rather novel connection is provided between the arm 103 and the boom 18. An open yoke 108 forms the rigid inner end of arm 103 and through the hollow portion of this yoke the boom 18 extends as indicated. The pivot 104 then passes through opposite sides of the yoke 108 and through the boom 18 providing a pivotal axis for arm 103. The jack 106 is then pivotally connected at 109 with the rear end of yoke 108 on the side of arm 103 opposite to that which carries the basket 105.

It is obvious that in the mechanism of FIG. 10 booms 10 and 18 may be manipulated to hold the basket 105 in almost any desired position after which the arm 103 may be manipulated about its pivot 104 by jack 106 to move the basket 105 up and down as desired.

The device of FIG. 10 may be folded into a carrying position as indicated in FIG. 11. Here the arm 103 has been pivoted around its pivot axis 104 to form an acute angle with the boom 18. Arm 103 is held in this position by the jack 106. This places the basket 105 in a protected position below the backhoe boom 10 but nevertheless clearing the ground for transportation by the vehicle 11.

What is claimed is:

1. Means for converting a backhoe boom into a composite lifting apparatus comprising a carrier, a backhoe boom having means mounting one end thereof on said carrier for movements about a vertical pivot and about a horizontal pivot respectively, the other end of said boom being free and adapted to pivotally support the dipper stick of a backhoe, power means operatively associated with said boom for causing said movements, an extensible hydraulic jack, means pivotally mounting one end of said jack on said backhoe boom spaced toward the carrier from the free end of said boom, the other end of said jack being adapted for pivot-pin connection to the dipper stick of a backhoe, a lifting boom having a pivotal mounting on said backhoe boom between the free end thereof and said one end of said jack, and means on said lifting boom for receiving said pivot pin connection of said jack; whereby the dipper stick of a backhoe may be quickly disassembled from said backhoe boom and said lifting boom assembled on said backhoe boom for operation by said jack.

2. The combination defined in claim 1 wherein, with said lifting boom connected to said backhoe boom at said pivotal mounting, the distance between said pivotal mounting of said one end of said jack on said backhoe boom and said means on said lifting boom for receiving said pivot pin connection substantially equals the length of said jack extended.

3. The combination of claim 2 wherein said means on said lifting boom for receiving said pivot pin connection projects upwardly on the upper side of said lifting boom when the latter is generally horizontal, and a slide adapted to be fixed on the upper side of said lifting boom extending from said pivot pin receiving means toward said lifting boom pivotal mounting, said slide being inclined to lift the other end of said jack from the level of said upper side of said lifting boom to the level of said pivot pin receiving means as said jack is extended.

4. The combination of claim 3 including means mounted on the upper side of said backhoe boom, between said pivoted mounting of said one end of said jack and the free end of said backhoe boom, of a height to hold said jack at a level above said pivotal mounting for said lifting boom when said backhoe boom is approximately horizontal.

5. The combination defined in claim 1, wherein said lifting boom includes a rigid vertical hoist assembly in position to clear the free end of said backhoe boom, and a winch for controlling a cable passing to the top of said lifting boom and thence downwardly to a load traveling on said vertical hoist assembly.

6. The combination defined in claim 5, wherein said lifting boom including said hoist assembly is provided at an intermediate height with means for folding the portion thereabove alongside the portion therebelow into a better position for traveling.

7. The combination of claim 6, wherein said jack and folded lifting boom and hoist assembly are movable to a position not substantially higher than said pivotal mounting of said lifting boom on said backhoe boom.

8. The combination defined in claim 1 including a lever arm, means for mounting one end of said lever arm near the upper end of said lifting boom, the free end of said arm adapted to support a manned basket or the like, and power means operatively connected between said lifting boom and said lever arm of moving the latter about its mounting means.

9. The combination of claim 8 wherein said one end of said lever arm comprises a yoke through which said lifting boom passes, and said last named power means comprises a cylinder and piston jack connected between said yoke and said lifting boom.

References Cited

UNITED STATES PATENTS

| | | | |
|---|---|---|---|
| 3,033,394 | 5/1962 | Kashergen | 214—138 |
| 3,144,135 | 8/1964 | Brown | 212—35 |
| 3,155,328 | 11/1964 | Longley | 214—138 |
| 3,235,097 | 2/1966 | Ohman | 212—55 |

ANDRES H. NIELSEN, *Primary Examiner.*